UNITED STATES PATENT OFFICE.

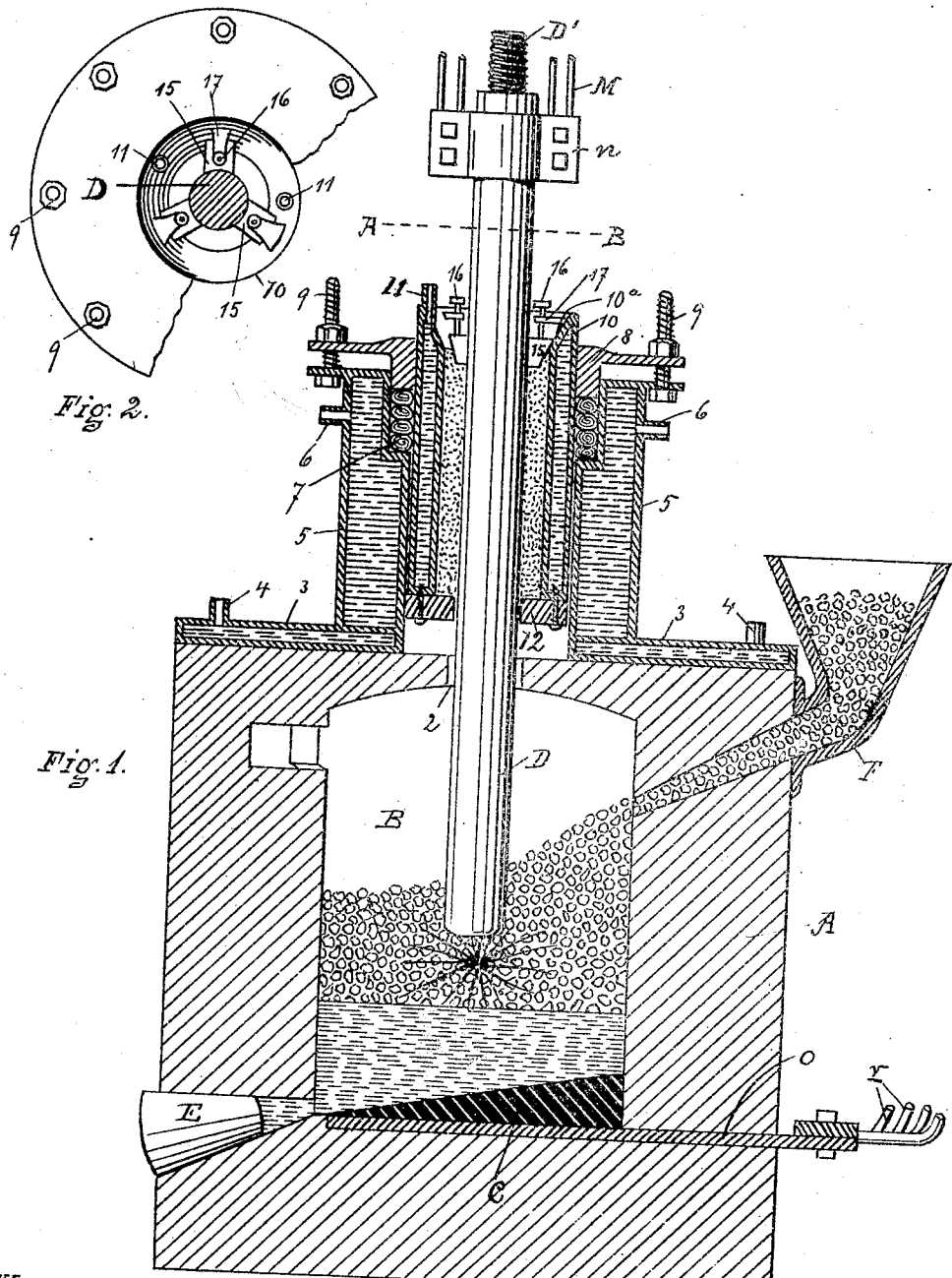

LE ROY WRIGHT STEVENS, OF SYRACUSE, NEW YORK, ASSIGNOR TO ADVANCE FURNACE COMPANY OF AMERICA, OF UTICA, NEW YORK.

ELECTRIC FURNACE.

No. 846,521.   Specification of Letters Patent.   Patented March 12, 1907.

Application filed September 16, 1905. Serial No. 278,767.

*To all whom it may concern:*

Be it known that I, LE ROY WRIGHT STEVENS, of Syracuse, in the county of Onondaga and State of New York, have invented certain new and useful Improvements in Electric Furnaces; and I do hereby declare that the following is a full, clear, and exact description thereof, which will enable others skilled in the art to which it appertains to make and use the same, reference being had to the accompanying drawings, and to the letters of reference marked thereon, which form part of this specification.

The particular object of my present improvement in electric furnaces is to provide a simple and efficient means for closing the opening in the wall of a furnace through which the electrode is passed, so as to efficiently exclude the air and permit the feeding of the electrode conveniently and continuously, and wherein provision is made for preserving the mechanism from destruction by the heat of the furnace and permit the use of irregular and more or less out-of-shape electrodes.

In the drawings, Figure 1 shows a vertical section of an electric furnace embodying my improvements. Fig. 2 shows a section of the electrode, taken on line A B of Fig. 1, together with a partial plan view of the parts immediately below the section-line.

Referring to the reference letters and figures in a more particular description of the device, A indicates the body of the furnace, which is provided with the usual internal chamber B for containing the materials to be operated upon. C indicates one electrode, provided in the bottom of the chamber B, while D indicates the movable or adjustable electrode usually connecting the positive pole of the generator. E is a plug or stopper for closing the discharge-opening from the chamber B, while F indicates a means for supplying the material to the chamber to be operated upon. The body A of the furnace is of course of refractory material and is provided in the top with an opening 2, through which the electrode D is introduced. On top of the body A, surrounding the opening 2, is a top plate 3, having a water-chamber and provided with means, as 4 4, for attaching the circulating-pipe. The top plate 3 also includes a stuffing-box member 5, which is also provided with a water-chamber and means for attaching circulating-pipes, said means being indicated by 6 6. The stuffing-box member 5 is considerably elongated and in the upper portion is provided with a recess in its inner wall adapted to receive the packing 7.

The stuffing-box gland is indicated by 8, and the stuffing-box is provided with screw-bolts 9 for closing the gland down on the packing. The stuffing-box receives the sliding sleeve 10, which is provided with a water-chamber within its walls, which chamber is provided with pipe attachments 11, whereby water may be circulated in the same. The inner wall of the sleeve 7 is of considerable larger diameter than that of the electrode D, which passes centrally through the same, and the upper end of the sleeve 10 is preferably given a conical form, as indicated at $10^a$. Applied to the lower end of the sleeve 10 is a ring 12, of refractory non-conducting material, the opening through the ring being practically the same in diameter as that of the electrode D. The space between the electrode and the inner wall of the sleeve 10 is adapted to be filled with some granulated refractory material, which is supported in this space by the ring 12.

For securing the sleeve 10 to the electrode D there is provided in the upper funnel-shaped end of the sleeve 10 wedges 15, of non-conducting refractory material, which wedges are forced into binding position, as between the sleeve on the outer side and the electrode D on the inner side by screws 16, supported in inwardly-projecting arms 17 in the upper end of the sleeve 10. Three of these securing devices are shown in the drawing. (See Fig. 2.)

The current conductors M are connected to the electrode D by means of a clamp $n$, and the electrode is preferably supported by the same wires or conductors. The upper end of the electrode D is preferably provided with a screw-threaded portion D', whereby a succeeding section may be readily attached, the following section being provided with a suitable screw-threaded socket in the end to receive the screw D'. The whole electrode, including the screw-threaded part D', is preferably, of course, of carbon.

It will be noted that when the packing-gland 8 is forced down it will compress the packing 7, so as to cause it to fit tightly against the outside of the sleeve 10 and exclude any air which might otherwise enter at this point. The sleeve 10 will be released from the electrode D from time to time, as occasion requires, and raised to its upper position, which will preferably be with the lower end at or just below the plane of the packing 7. The sleeve 10 will then be attached to or connected to the electrode D by forcing down the wedging-blocks 15. The space within the sleeve will be filled from time to time with powdered refractory material, as before mentioned, and if some small quantity of this material escapes through the opening in the ring 12 and around the electrode when the sleeve is being slipped up the electrode it will not matter, as more can be supplied in the funnel-shaped top. The material used for this granulated packing may be the same as is being operated upon by the electric furnace.

It will be noted that the length of the sleeve 10 is such as to allow considerable vertical movement in the stuffing-box before it is necessary to disengage it from the electrode and shift its position with reference thereto. As the electrode burns off or otherwise disappear the clamp $n$ will need to be released from time to time and moved farther up on the electrode.

The lower electrode C is mounted on or electrically connected with the conductor-plate $o$, which extends to the exterior of the furnace-body and has means for attaching the conductor-cables $r$, which preferably extend to the negative side of the generator.

In this construction it will be noted that the packing 7 is well protected from the heat of the furnace and that in case the electrode D becomes heated to some considerable distance up from its lower end within the chamber it will have no detrimental effect upon the packing 7 and that the opening into the furnace-chamber through which the electrode D is introduced can be kept air-tight without the means employed becoming destroyed and injured from the heat of the electrode or that of the furnace. In this device electrodes which are more or less irregular in form and in which the connecting-joints between sections are more or less defective and out of true may be successfully used.

It is evident that modifications and changes in and from the construction described may be made without departing from the spirit of my invention.

What I claim as new, and desire to secure by Letters Patent, is—

1. The combination with the furnace-body and the electrode of a stuffing-box, a movable sleeve mounted in the stuffing-box and surrounding the electrode, and providing a space between the inner wall of the sleeve and the electrode, granular refractory material in said space, means for retaining the granular material in position in the sleeve, and means for connecting the sleeve to the electrode, substantially as set forth.

2. The combination with the furnace-body and the electrode of a stuffing-box, a movable sleeve mounted in the stuffing-box and surrounding the electrode, and providing a space between the inner wall of the sleeve and the electrode, granular refractory material in said space, and means for retaining the granular material in position in the sleeve, substantially as set forth.

3. The combination with the furnace-body and movable electrode of an upright opening in the body through which the electrode is passed into the chamber of the body approximately fitting the electrode at the lower end and enlarged to provide a space, granular refractory material in said space surrounding the electrode above the closely-fitting point, substantially as set forth.

4. The combination in an electric furnace having a furnace-body with an interior chamber and a movable electrode, an upright opening through which the electrode is passed into the chamber, said opening approximately fitting the electrode at the inner end and enlarged to provide a space for granular refractory material above the closely-fitting point, and granular refractory material filling said space, substantially as set forth.

5. The combination with the furnace-body having an interior chamber, and the electrode of an electric furnace, of a stuffing-box, a movable sleeve mounted in the stuffing-box and surrounding the electrode, and providing a space between the inner wall of the sleeve and the electrode, and having means for circulating water within the body of the sleeve, granular material in said space means for retaining the granular material in position within the sleeve, and means for connecting the sleeve to the electrode, substantially as set forth.

6. The combination with the furnace-body having an internal chamber and the electrode of an electric furnace, of a stuffing-box, a movable sleeve mounted in the stuffing-box and surrounding the electrode and providing a space between the inner wall of the sleeve and the electrode for granular refractory material, a wall of non-conducting refractory material closing the lower end of said space, and granular refractory material contained in said space, substantially as set forth.

7. The combination with the furnace-body having an internal chamber and the electrode of an electric furnace, of a stuffing-box surrounding an opening through the body into the chamber, a movable sleeve mounted in the stuffing-box and surrounding the electrode, and means for connecting the sleeve to the electrode, substantially as set forth.

8. The combination with the furnace-body having an interior chamber and the electrode of an electric furnace, of a stuffing-box, a movable sleeve mounted in the stuffing-box and surrounding the electrode, and provided with an interior chamber, and means for circulating water through said chamber, substantially as set forth.

9. The combination with the furnace and electrode of an electric furnace, of a stuffing-box having a chamber for packing surrounding the electrode, and a chamber for circulating water, of a sleeve surrounding the electrode and working in said stuffing-box, substantially as set forth.

In witness whereof I have affixed my signature, in presence of two witnesses, this 18th day of August, 1905

LE ROY WRIGHT STEVENS.

Witnesses:
S. I. DEVINE,
E. S. HESSE.